United States Patent [19]
Appelbaum

[11] Patent Number: 5,251,066
[45] Date of Patent: Oct. 5, 1993

[54] BATHROOM MIRROR DEMISTER

[76] Inventor: Paul Appelbaum, 219 Broadway, Suite 510, Laguna Beach, Calif. 92651

[21] Appl. No.: 974,609
[22] Filed: Nov. 12, 1992
[51] Int. Cl.⁵ .............................................. G02B 7/18
[52] U.S. Cl. ..................................... 359/509; 219/219
[58] Field of Search ...................... 359/509, 838, 845; 219/219

[56] References Cited
U.S. PATENT DOCUMENTS

| | | | |
|---|---|---|---|
| 1,465,292 | 8/1923 | Wessig | 219/219 |
| 2,617,701 | 11/1952 | Fennell | 219/219 |
| 2,796,506 | 6/1957 | Lumbert | 359/509 |
| 3,059,540 | 10/1962 | Robinson | 359/509 |
| 4,037,079 | 7/1977 | Armbrustor | 219/219 |
| 4,653,201 | 3/1987 | Seaman | 219/219 |
| 4,701,594 | 10/1987 | Powell | 219/219 |
| 4,836,668 | 6/1989 | Christsanson | 359/509 |
| 5,124,532 | 6/1992 | Hafey et al. | 219/219 |

Primary Examiner—Tim Miles
Attorney, Agent, or Firm—Charles C. Corbin

[57] ABSTRACT

Disclosed is a device for demisting the surface of a bathroom mirror using hot air supplied by a portable hand-held hot-air blower, and including air-conducting apparatus having duct elements that are detachably mounted along the perimeter of the mirror surface using suction cups or the like. Each duct element has a plurality of spaced-apart nozzles or apertures, and a tubular inlet member is pivotally attached in flow communication with the air-conducting apparatus, and is adapted to slidably and removably receive the tubular exhaust nozzle of the portable blower such that hot air supplied by the blower will exit the duct nozzles and move across the surface of the mirror so as to remove water condensate from the mirror surface.

8 Claims, 1 Drawing Sheet

BATHROOM MIRROR DEMISTER

BACKGROUND OF THE INVENTION

1. Field of the Invention.

The present invention relates to devices for demisting mirrors, and more particularly to devices for demisting bathroom mirrors.

2. Description of the Prior Art.

The misting over of a bathroom mirror that adjoins a shower is a problem that one frequently encounters just after showering. This represents an annoyance which renders the mirror temporarily unusable for such tasks as shaving, grooming, and applying makeup. A common approach to the problem is to wipe the mirror off with a dry towel, however, this usually provides only temporary relief since the moisture remaining in the bathroom environment will tend to continue to condense and cloud the mirror surface. Other common efforts at remedying this problem involve the opening of a bathroom window, if there is one, or opening the bathroom door so as to vent the airborne moisture. Unfortunately, this method does not work instantly and may affect one's comfort, convenience, and privacy. Another way to combat the problem is to pre-treat the mirror by spraying it with a chemical substance that minimizes the condensation of moisture on the mirror surface; however, there are several reasons why a chemical solution to the problem is not desired.

SUMMARY OF THE INVENTION

In view of the foregoing, it is a general object of the present invention to provide a way to quickly and effectively remove condensed water vapor from the surface of a bathroom mirror.

Another object of the present invention is to provide a means to de-mist a bathroom mirror without compromising one's comfort, convenience or privacy.

Yet another object of the present invention is to avoid chemical solutions to the aforementioned problem.

Yet another object of the present invention is to provide a simple, yet effective apparatus that is readily mounted to a mirror and which utilizes a commonly available portable hand-held hair dryer.

Accordingly, the present invention provides apparatus that is attachable to the surface of a bathroom mirror for allowing a hand-held hot air blower to be used for demisting the bathroom mirror, including a first horizontally extending duct having an array of exhaust nozzles including means for removably attaching the first duct along a lower edge of the mirror surface, and at least one similarly constructed vertical duct in flow communication with the first duct, and extending upwardly along a side edge of the mirror surface from one end of the horizontal duct. Attached to an end of the horizontal duct is a coupling member featuring a pivotable socket that is adapted to slidably and removably receive the tubular exhaust nozzle of the portable air blower, whereby hot air from the blower can be harnessed and directed from the nozzles and over the mirror surface. In preferred embodiments of the invention each duct is adjustable in length by virtue of having telescopically connected duct components.

DETAILED DESCRIPTION OF THE INVENTION

Figure 1:
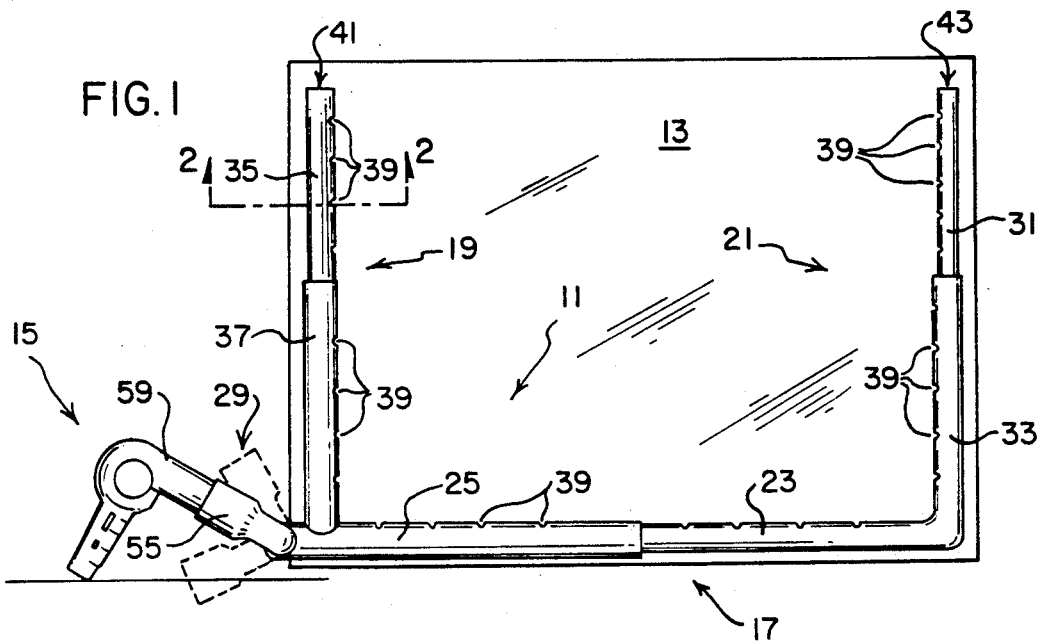
FIG. 1 is an elevational view illustrating a preferred embodiment according to the present invention.

Referring now to the drawings, FIG. 1 illustrates one preferred embodiment of the invention in the form of a duct assembly 11 which will be seen to be readily mountable to the surface of a rectangular bathroom mirror 13 for use in de-misting the mirror 13 with the aid of a portable blower 15 in a manner to be described.

Apparatus 11 is comprised of essentially three main components, namely, a hot-air duct arrangement having a horizontal component 17 and upright components 19 and 21, and attachment mechanism 27 for removably and non-intrusively attaching the duct arrangement to the face of mirror 13, and finally a pivotable socket 29, connected to the duct arrangement, and adapted for being releasably coupled to the blower 15 when using the inventive device in a manner that will be described hereinafter.

The duct arrangement as well as the pivotable socket 29 are constructed of a suitable plastic material and are generally tubular hollow structures. FIG. 1 shows that the horizontal component 17 is actually comprised of a first section 23 that is slidably and telescopically received within a second horizontal section 25. It will be seen that this will allow the length of the horizontal component 17 to be adjusted as required so as to fit the width of mirror 13. The fit between the telescoping sections should be sufficiently close to prevent any appreciable escape of air between the adjoining parts. Note that the upright duct component 21 is also adjustable in length by virtue of the upright section 31 being telescopically received within the bore of the larger upright piece 33. Also note that the other upright duct component 19 is similarly constructed, having a duct piece 35 that is telescopically received in a larger duct section 37. An array of nozzles or apertures 39 is provided along an edge of each of the duct components as illustrated in FIG. 1. Note also that the upper ends 41 and 43 of the sections 35 and 31 respectively, are closed. It is further noted that by virtue of the more remote telescoping sections being smaller in diameter than the sections closer to the hot air source, the uniformity of velocity of the hot air that will be expelled through the apertures 39 will tend to be maintained.

Figure 2:
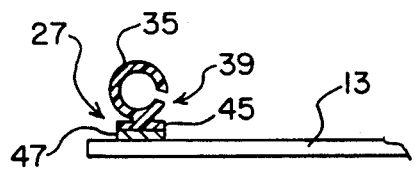
FIG. 2 is an enlarged sectional view taken along the line 2—2 of FIG. 1.
Figure 3:
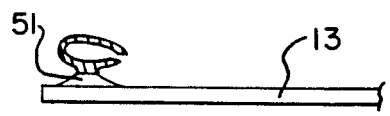
FIG. 3 is an enlarged cross-sectional view similar to FIG. 2, but taken through a variant of the present invention.

FIG. 2 is a typical cross-section through a duct wall, and shows aperture 39 as well as the attachment mechanism for the duct which comprises a suitable pressure-sensitive adhesive strip 47 secured to the bottom surface of a foot 45 of the duct 35. It is appreciated that other suitable means for removably attaching the duct components to the surface of mirror 13 will become evident to those with ordinary skill in this particular art. In this regard, the variant of the present invention illustrated in FIG. 3 shows the use of suction cups 51. This variant also illustrates that under the present invention the ducts can take on other than a circular cross-sectional configuration.

The pivotable socket 29 is connected in a conventional manner in flow communication with the duct piece 25 and can turn about a generaly horizontal axis, and includes a tubular receptor portion 55 that has a diameter designed to snugly yet releasably receive the tubular nozzle 59 of the blower 15, which is a portable hair dryer of conventional design.

Apparatus 11 is preferably installed to a mirror 13 in the manner indicated in FIG. 1, that is, with the horizontal component 17 suitably extended and attached along a lower edge of mirror 13 and with the upright components 19 and 21 suitably extended and attached along opposite side edges of mirror 13.

In order to operate device 11, blower 15 is attached to the socket 29. Preferably there is a convenient horizontal ledge adjacent the bottom of mirror 13 upon which ledge the blower 15 may be supported while remaining connected to socket 29. The blower 15 can then be set to blow hot air, and turned on. This will force hot air through the duct components and out through nozzles 39.

While particular embodiments of the invention have been described herein, it is not intended that the invention be limited thereto, since various modifications and changes may readily occur to those skilled in the art without departing from the invention. Therefore, it is aimed to cover all such changes and modifications that fall within the true spirit and scope of the invention as described in the claims which follow.

What is claimed is:

1. Device for demisting the surface of a mirror mounted to a vertical wall, using hot air supplied by a portable hand-held hot-air blower having a tubular exhaust nozzle, and said mirror being generally rectangular and said surface including a lower edge portion, and opposing side edge portions, said device including:
   a) a first, horizontally extending duct member having a plurality of spaced-apart nozzles along one side of said duct member, said duct member adapted to extend along said mirror lower edge portion;
   b) at least one vertically extending duct member having a plurality of spaced-apart nozzles along one side of said duct, and connected in flow-communication with one end of said first duct and adapted to extend along one of said mirror surface side edge portions;
   c) fastening means for removably attaching said first and said vertically extending ducts to said mirror surface; and
   e) a generally tubular inlet member for hot air, attached in flow-communication with said first duct member, and adapted to slidably and removably receive the tubular exhaust nozzle of said blower, whereby said device is operative to receive hot air from said blower and direct said hot air through said nozzles and across the surface of said mirror.

2. Device as defined in claim 1 wherein a first vertically extending duct extends from one end of said first duct, and a second vertically extending duct extends from the other end of said first duct.

3. Device as defined in claim 1 wherein said first duct has two portions, and one portion is telescopically received in the other whereby the length of said first duct can be adjusted.

4. Device as defined in claim 1 wherein said fastening means comprises a plurality of suction cups.

5. Device as defined in claim 1 wherein said fastening means comprises a film of pressure-sensitive adhesive attached to said duct members.

6. Device as defined in claim 1 wherein said tubular inlet member is pivotally mounted to said horizontal member.

7. Device as defined in claim 6 wherein said inlet member rotates about a horizontal axis.

8. Device as defined in claim 1 wherein said at least one vertically extending duct has a first section, and a second section that is telescopically received in said first section, so that the length of said duct is adjustable.

* * * * *